Sept. 28, 1965  A. S. HUMPHERYS  3,208,225
SINKING FLOAT-OPERATED IRRIGATION GATE
Filed May 4, 1962  6 Sheets-Sheet 1

INVENTOR.
ALLAN S. HUMPHERYS
BY
*R. Hoffman*
ATTORNEY

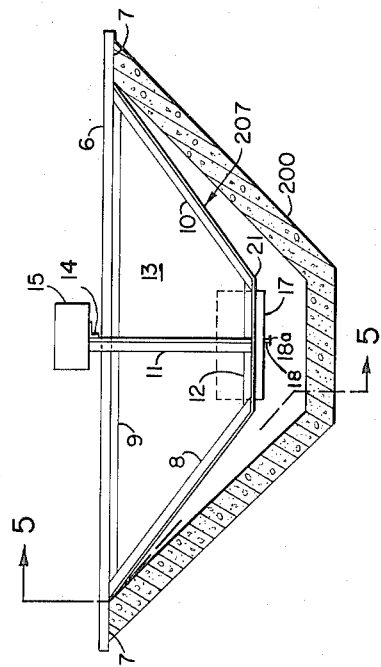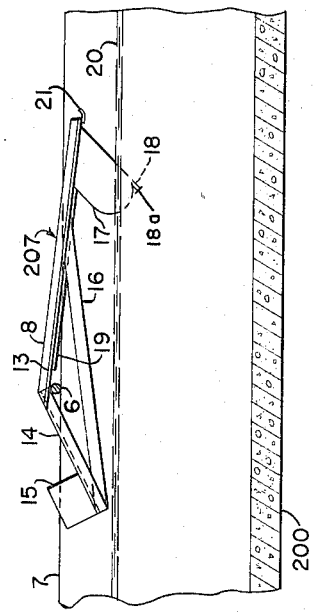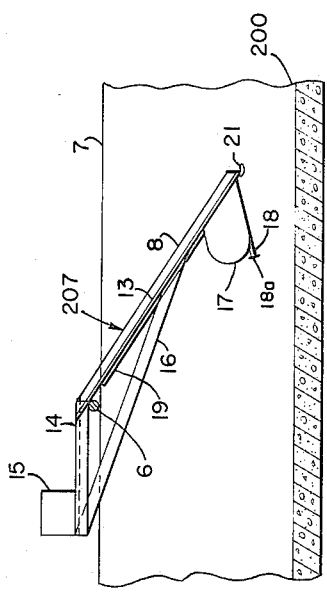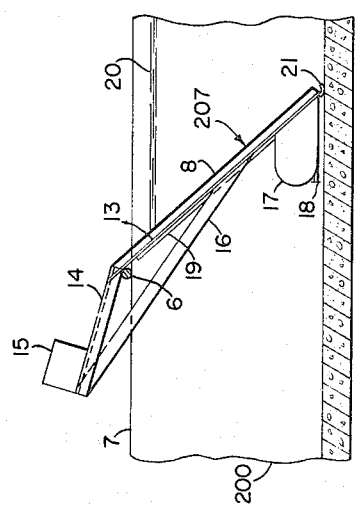

INVENTOR.
ALLAN S. HUMPHERYS

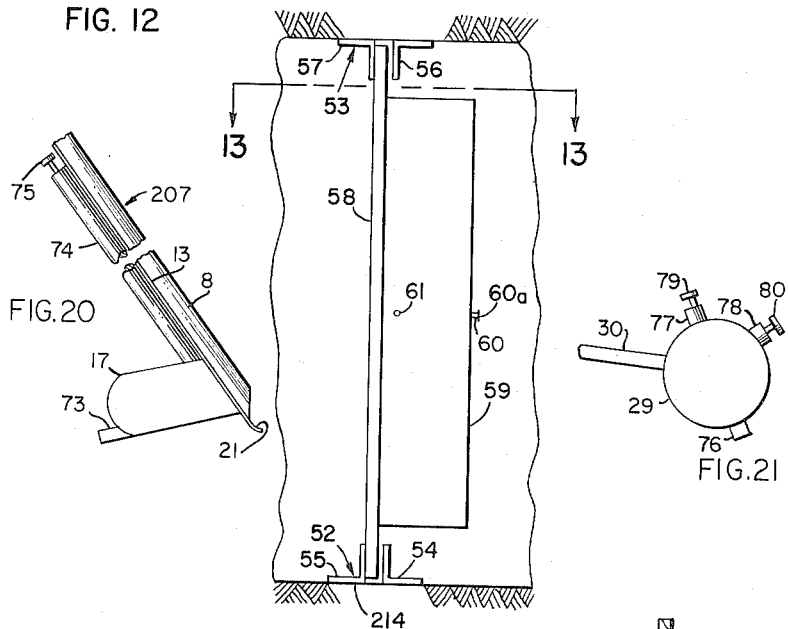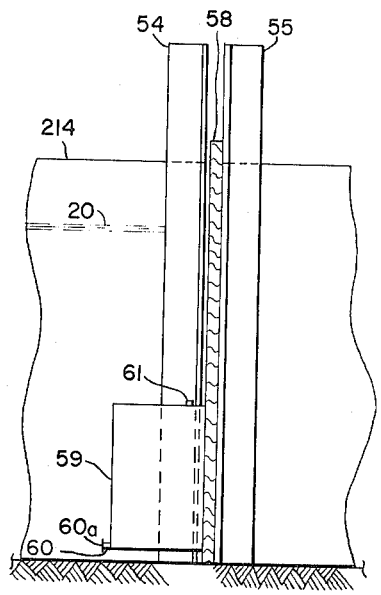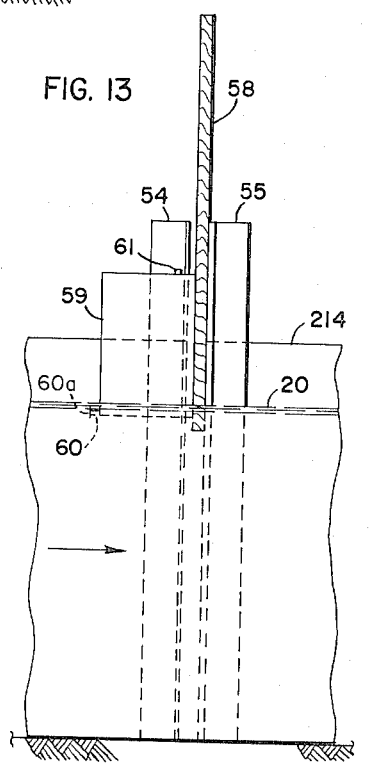

Sept. 28, 1965     A. S. HUMPHERYS     3,208,225
SINKING FLOAT-OPERATED IRRIGATION GATE
Filed May 4, 1962     6 Sheets-Sheet 5
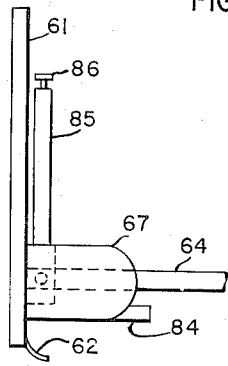
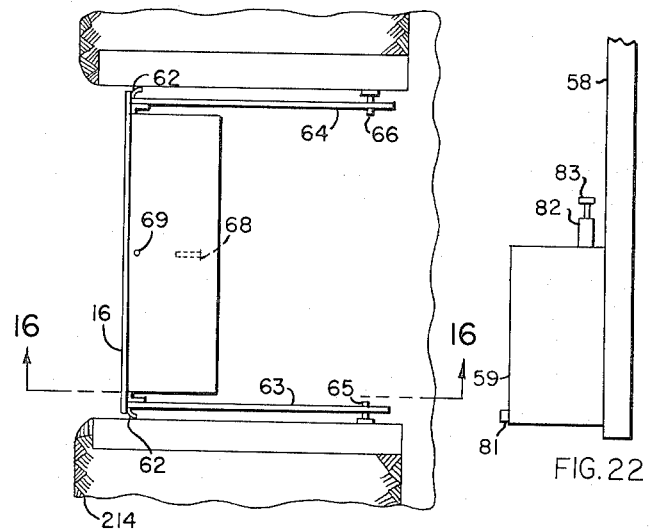
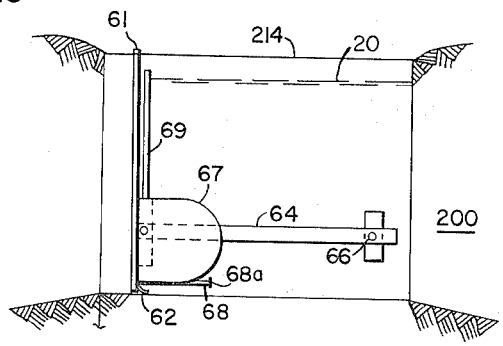
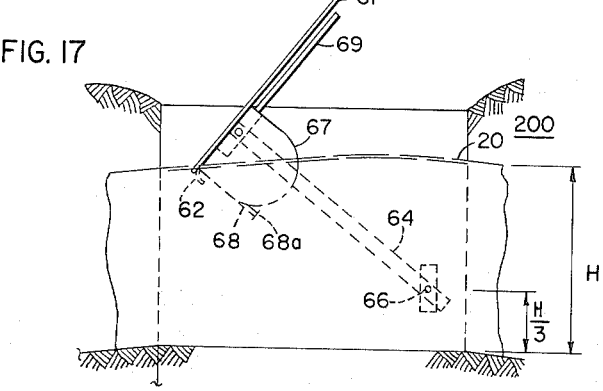
INVENTOR.
ALLAN S. HUMPHERYS
BY
ATTORNEY

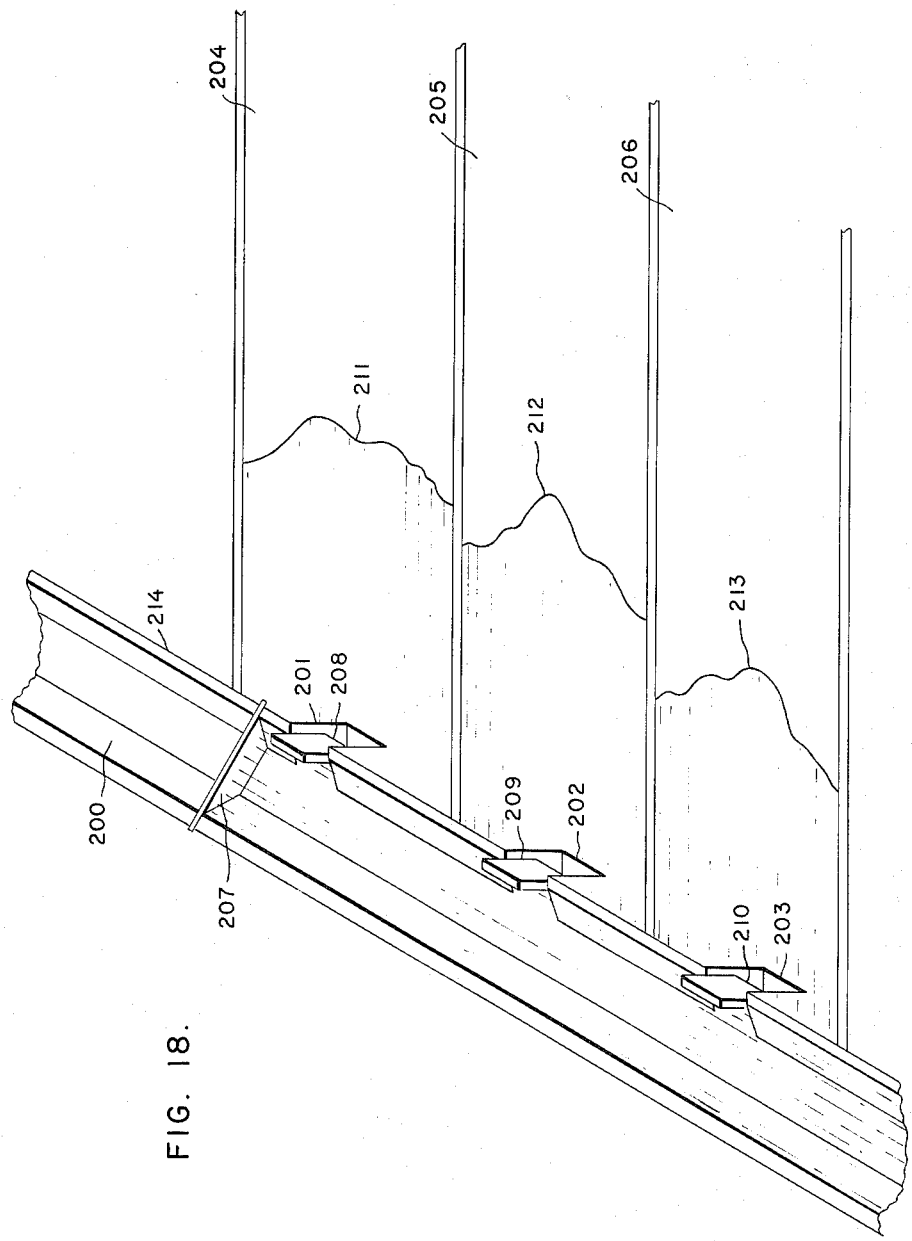

United States Patent Office 3,208,225
Patented Sept. 28, 1965

3,208,225
SINKING FLOAT-OPERATED IRRIGATION GATE
Allan S. Humpherys, Boise, Idaho, assignor to the United States of America as represented by the Secretary of Agriculture
Filed May 4, 1962, Ser. No. 192,609
1 Claim. (Cl. 61—25)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to float-operated irrigation gates.

More particularly, the invention relates to sinking float-operated irrigation gates which may be used as automatic check gates in an irrigation head ditch or as gates to control the flow of water through outlets in the head ditch to admit water to a furrowed or bordered field a portion at a time.

Much labor is required to irrigate cropland with conventional methods and equipment. The scarcity and high cost of good farm labor generally results in inefficient irrigation, with its attendant problems. Where water itself is scarce, this often leads to an undesirable waste of that expensive commodity.

Accordingly, one object of this invention is to provide an automatic check gate for stopping the flow of water in an irrigation ditch after the lapse of a predetermined time. Another object is to provide a border outlet gate for automatically controlling the flow of water from the head ditch into a border or set of furrows. Still another object is to provide such a gate whereby a field may be irrigated one portion at a time. A further object is to provide a gate that will automatically reset itself and be ready for the next irrigation cycle when irrigation has been completed.

The above and other objects, which will become apparent to those skilled in the art, are achieved, in general, by mounting a float to a gate and providing the float with a valve for admitting water at a controlled rate whereby the float will lose its buoyancy and will sink in a predetermined time to close the gate. When the ditch is emptied, the water in the float runs out through the valve and the gate is again ready for another irrigation cycle.

In order that the invention may be fully understood, reference is made to the following description and the accompanying drawings which show the several aspects of the invention partially schematically and in which FIGURE 1 is a front elevation of a simplified form of sinking float;

FIGURE 4 is a front elevation, looking downstream, of the use of a sinking float with an irrigation head ditch check gate;

FIGURE 5 is a side elevation in section taken on line 5—5 of FIGURE 4, showing the position of the check gate when no water is in the ditch;

FIGURE 6 is a section similar to that of FIGURE 5 showing the gate in the fully open position with the ditch filled with water;

FIGURE 7 is also a section similar to that of FIGURE 5 showing the gate in its closed position;

FIGURE 12 is a plan view of a second type of border outlet gate;

FIGURE 13 is a side elevation in section, viewed on line 13—13 of FIGURE 12, showing the gate in the open position;

FIGURE 14 is a view, similar to that of FIGURE 13, showing the gate in the closed position;

FIGURE 15 is a plan view of the invention as applied to a third type of border outlet gate;

FIGURE 16 is a side sectional elevation on line 16—16 of FIGURE 15, showing the gate in its normal closed position;

FIGURE 17 is a view, similar to that of FIGURE 16, showing the gate in the open position;

FIGURE 18 is a schematic illustration, in perspective, of a portion of a complete irrigation system in which the check gate and border outlet gates of the present invention can be used;

FIGURE 19 shows a variation of the gate shown in FIGURES 1–3 in which a control valve is placed in the air vent instead of in the water inlet of the float;

FIGURE 20 shows a variation of the gate shown in FIGURES 4–7 in which a control valve is placed in the air vent instead of in the water inlet of the float;

FIGURE 21 shows a variation of the gate shown in FIGURES 8–11 in which control valves are placed in the air vents instead of in the water inlet of the float;

FIGURE 22 shows a variation of the gate shown in FIGURES 12–14 in which a control valve is placed in the air vent instead of the water inlet of the float; and FIGURE 23 shows a variation of the gate shown in FIGURES 15–17 in which a control valve is placed in the air vent instead of in the water inlet of the float.

Figure 2:
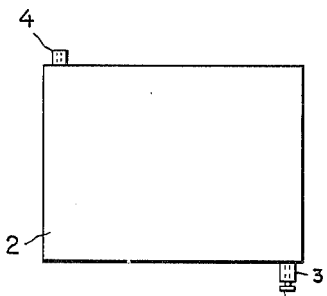
FIGURE 2 is a side elevation of the float shown in FIGURE 1.
Figure 1:
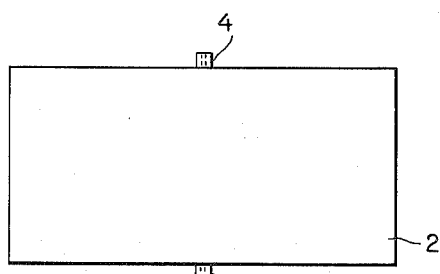
Figure 3:
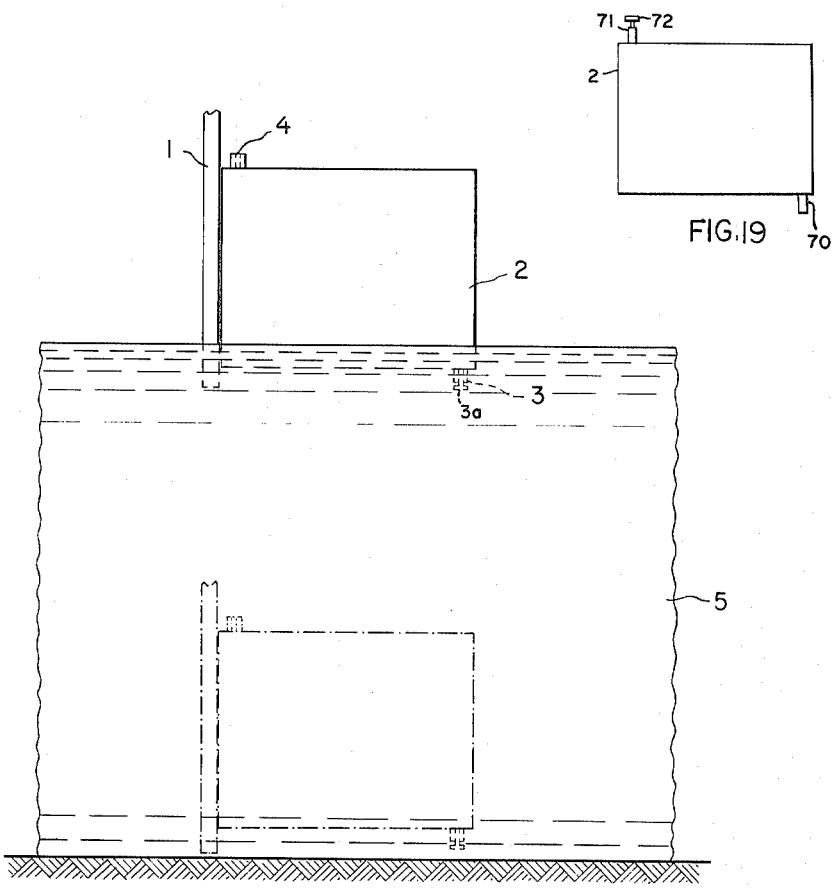
FIGURE 3 is a schematic representation illustrating the basic principle of operation of the invention.

As stated above, FIGURES 1–3 are a schematic representation of a simplified structure to illustrate the principle operation of the invention. Thus, referring to FIGURE 3, a gate member 1, mounted for vertical movement on any suitable guides (not shown), is provided with a hollow float 2 secured to it near the lower edge thereof. The size and shape of the float are not critical and can be varied to meet the requirements of the particular structure with which it is to be used. Regardless of its size or shape, the float is provided with a control valve 3, adjustable by means of thumbscrew 3a at its lowest point and with a vent 4 at the highest point. When a ditch or channel is initially filled with a body of water 5, the float is empty and is buoyant. It floats to the surface, thereby opening the gate. However, as water flows into the float, air is forced out through vent 4, the float becomes less buoyant, and gradually sinks, closing the gate. The speed with which the gate closes can be predetermined by adjusting the opening in the valve to admit water at a desired rate.

Although control valve 3 is described and shown at the water intake opening at the bottom of the float, it may instead be placed at vent 4 to control the rate at which air escapes rather than the rate at which water enters the float. Thus, the water inlet 3 can be replaced, as shown in FIGURE 19, by inlet 70 and the vent 4 of FIGURES 1–3 replaced by a vent 71 provided with a thumbscrew 72 for controlling the passage of air. This latter arrangement is particularly desirable where the valve would be subject to clogging by debris carried in the irrigation water and an open unobstructed opening at the bottom of the float is desired.

Although the water level drops, the float is prevented from draining itself as long as there is any water in the ditch. However, when the level reaches that of the valve, water drains from the float through the valve and the former is again buoyant for when water is again admitted to the ditch.

A popular system for irrigating fields makes use of a head ditch or channel along the border of a field, with provision made for drawing off water through openings in its side for distribution to furrows or borders arranged generally transversely to the ditch. A portion of such a system is illustrated in FIGURE 18. As seen in the figure, the ditch 200 is provided with a number of border openings or outlets 201, 202, and 203 which open from the ditch into borders 204, 205, and 206, respectively. Irrigation may be accomplished first in those fields closest to the source of water or by irrigating first those that are farthest from the water sources depending upon the type and arrangement of the gates. According to this invention, the ditch is provided at a downstream point with a check gate 207 mounted to swing about an axle 6 having a horizontal axis transverse to the length of the ditch. Any suitable bearing means (not shown) may be provided at the top of the sides 7 of the ditch to support the axle. When water is admitted to the ditch, gate 207 closes, causing the water level to rise. The water rises above the bottom of field openings 201, 202, and 203 and flows through the openings, with or without gates, into borders 204, 205, and 206, respectively. Water advancing along the surfaces of these borders is indicated by 211, 212, and 213. With this particular system, fields farthest away from the water source are irrigated first.

According to this invention, border openings 201, 202, and 203 are also provided with schematically shown gates 208, 209, and 210, respectively, which open automatically when the water level rises permitting water to flow into borders 204, 205, and 206. Gates 208, 209, and 210 are provided with sinking floats (not shown) as will be more fully described below. Gate 207 in this case opens after gates 208, 209, and 210 close and the fields closest to the water source are irrigated first as hereinafter described.

As already stated, FIGURE 18 is a schematic representation of the irrigation system to which the herein described invention is particularly applicable. Check gate 207 shown the general outline of the form shown in detail in FIGURES 4–7. However, border gates 208, 209, and 210 are merely shown schematically to illustrate their location and function. Their actual structure will be described in detail below.

*Figures 4–7*

As shown in FIGURES 4–7, the ditch 200 is provided with a gate indicated generally as 207. The size and shape of the gate are such that, when closed, it will fill the cross-sectional area of the head ditch and act as a dam. The gate member may be of any suitable construction. Thus, as shown in FIGURE 4, it comprises a framework of angle irons 8, 9, 10, 11, and 12 which support a plate of sheet metal 13. The axle 6 is secured to the top edge of the gate in any suitable manner, as by welding. A support member 14, secured to and extending upward from the axle, carries a counterweight 15 which counterbalances the gate and is heavy enough to keep it in a partially open position when there is no water in the ditch. This is shown in FIGURES 4 and 5. A bracing member 16, extending between the end of support member 14 and the gate itself, is provided to make the structure rigid.

At the bottom of the gate on its downstream side there is secured a hollow float 17 which is provided with an adjustable water inlet valve 18 at its lowest point and an elongated venting tube 19 at its highest point.

A gate as above described can be used in conjunction with a plurality of similar or other automatic gates placed at strategic points along an irrigation ditch as shown in FIGURE 18.

Irrigation proceeds from the lower end of the ditch toward the upper end. When water is turned into the ditch, it flows to the lower end and runs onto the field through the field outlets at that end. Because of the buoyancy of float 17, gate 207 is lifted and rides the water surface 20, as shown in FIGURE 6. Control valve 18 is adjusted by means of thumbscrew 18a to admit water into the float at a rate which will permit the gate to remain open as long as desired. When the float sinks, it causes the gate to swing toward a closed position. Pressure of the running water against the upstream side forces the gate shut and holds it in that position, as shown in FIGURE 7. A rubber strip 21 around the perimeter of the gate helps to seal it against the sides of the ditch to prevent excess leaking of water. The tube 19, connected to the uppermost point of the float and long enough to extend above the surface of the water in the ditch, allows air displaced from the float to escape to the atmosphere. This is desirable because, without the tube, air bubbles would collect on the under side of the gate and surface tension would hinder their movement to the surface. As a variation, water inlet valve 18 can be replaced by inlet 73, shown in FIGURE 20, while the vent tube 19 is replaced by tube 74 provided with thumbscrew 75 for controlling the rate of escape of air.

While water from the upstream side of the gate drains off to the adjoining field, water also drains from the float, permitting the gate to reset automatically to the open position shown in FIGURES 4 and 5. It is now ready for another irrigation cycle.

*Figures 8–11*

The form of sinking floate gate shown in FIGURES 8–11 is particularly useful as a border outlet gate in conjunction with the automatic check gate 207. It will, of course, be apparent that any form of check gate can be used in place of gate 207. The border outlet gate can be used in any one of border outlets 201, 202, or 203 in side 214 of the ditch, as shown in FIGURE 18.

This gate is a paddle-wheel type mounted, for example, in border inlet 201. Paddle 22 forms the gate which is normally closed to prevent water from entering the adjoining border through the outlet 201. A rubber strip 51, only part of which is shown along the bottom edge of gate paddle 22, is provided along the periphery of the gate. Water pressure forces the strip against the sides of the border outlet and prevents water from leaking into the border before the gate is opened at the desired time. The paddle is secured by any suitable means to horizontal axle 23 which is rotatably mounted on bearings 24 and 25 at the top of the sides of the border outlet opening. Three other paddles 26, 27, and 28 are also secured to the axle; all four paddles being radially disposed and substantially at right angles to each other. The function of the additional paddles will be explained below.

Paddle 22 is provided with a float-operated mechanism for tripping the gate which comprises a hollow, closed float 29 secured to the free end of an elongated arm 30 parallel to the face of the gate. The end of arm 30 remote from the float is bent at right-angles to the gate and is rotatably mounted in a short cylindrical bearing 31 that extends completely through the gate. A shorter arm 32 is secured on the back side of the gate to the portion of arm 30 that extends through the cylindrical bearing and rotates with arm 30. A short rod or follower 33, secured to the free end of arm 32, engages rocker arm 34 which is pivotally mounted on the back side of the gate by means of pivot 35. Rocker arm 34 is connected to a latch bar 36 at the toe of the gate by means of cable 37. The rocker arm 34 is maintained in the normal position, as shown for example, in FIGURE 10, by means of attached opposing tension springs 43 and 44, one of which (43) is also attached to the face of gate paddle 22 and the other (44) is also attached to axle 23. The latch bar 36 is maintained in the normally extended position shown in FIGURE 9 by means of a spring (not shown) to engage a stop 38 secured to the bottom of border opening 201.

Figure 8:
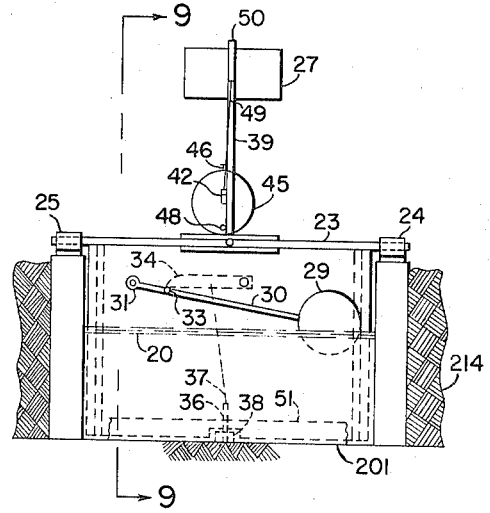
FIGURE 8 is a front elevation of the invention applied to one type of a border outlet gate shown in the closed position, with water in the head ditch.

Paddle 27, as shown in FIGURE 8, is a flat member considerably smaller in area than paddle 22 (which constitutes the gate), and is secured to axle 23 by means of support arm 39. Paddles 26 and 28 are similar in construction to paddle 27, being secured to axle 23 by means of support arms 40 and 41, respectively.

Support arm 39 carries an elongated pivotally mounted arm 42, to one end of which is attached a sinking float 45. The latter is provided with an adjustable water-inlet valve 46 and a pair of ports or vents 47 and 48. The other end of arm 42 is attached by means of cable 49 to latch bolt 50 which is similar to latch bolt 36. Latch bolt 50 is also maintained in a normally extended position by means of a spring (not shown).

Figure 9:
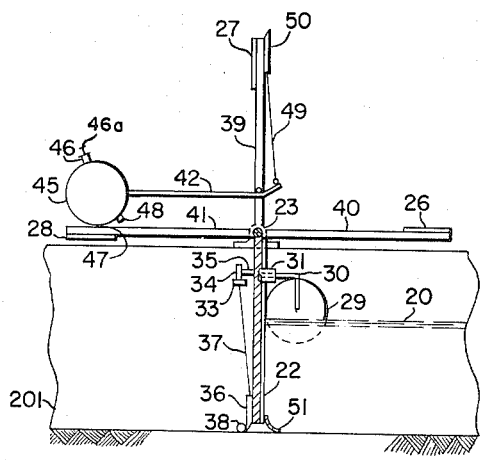
FIGURE 9 is a side elevation in section taken on line 9—9 of FIGURE 8.
Figure 11:
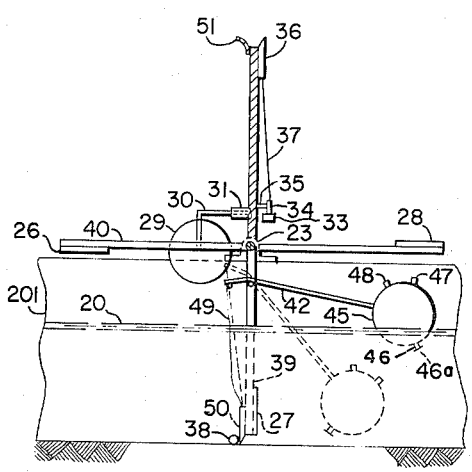
FIGURE 11 is a side elevation section taken on line 11—11 of FIGURE 10.
Figure 10:
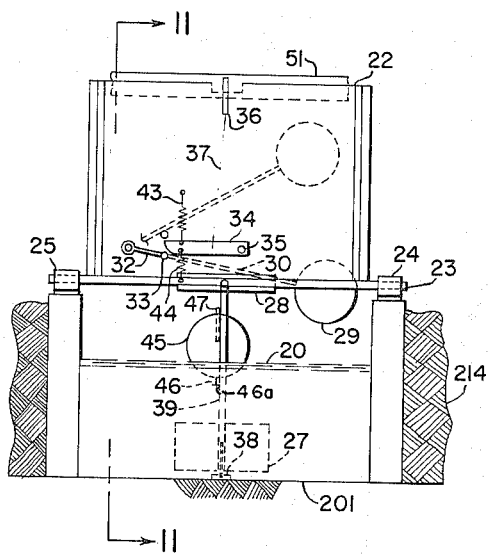
FIGURE 10 is a front elevation showing the gate of FIGURE 8 in the open position.

When water backs up behind closed check gate 207 in ditch 200, float 29, riding the water surface, reaches a predetermined height at which follower 33 contacts the lower edge of rocker arm 34 and pushes the latter upward. Motion is transmitted from rocker arm 34 to the gate latch through cable 37. The gate latch bolt 36 is thereby pulled free from stop 38 and water pressure on the upstream side of the gate forces the gate open. Float 29 may be adjusted to open the gate at any desired water level. When the gate is tripped, water pressure against paddle gate 22 causes the paddle-wheel to turn. As it turns, water engages paddle 26 and the paddle-wheel continues to rotate. When gate 22 has rotated 180°, the gate is in its fully open position as shown in FIGURES 10 and 11. It is stopped in this position by latch bolt 50 on the back of paddle 27, engaging stop 38. Water pressure against paddle 27 holds the gate in this position. When the paddle-wheel reaches this position, sinking float 45 rests upon the water surface. Water begins to enter float 45 through control valve 46, which is adjustable by means of thumbscrew 46a, as displaced air escapes through ports 47 and 48. When float 45 becomes full of water, it sinks beneath the water surface. The weight of the submerged float plus the force of running water against it causes it to fall to the position shown by the dotted lines in FIGURE 11. In reaching this position motion is transferred through float lever arm 42 and cable 49 to latch bolt 50. The bolt is thus pulled free from stop 38 and water pressure against paddle 27 causes the paddle-wheel again to turn. The extra weight of paddle 22, in addition to water pressure on paddle 28, causes the gate to continue rotating. It rotates 180° until it again reaches its closed position as shown in FIGURES 8 and 9 and is once more held in this position by bolt 36 engaging stop 38. In this position sinking float 45 is full of water and comes to rest as shown in FIGURE 9. Water is free to drain from the float through port 47, which, in this position, is located at the lowermost point of the float. The length of time that the paddle-wheel remains in its open position and, therefore, the duration of irrigation, is determined by the time it takes float 45 to sink. This time is regulated by adjustment of control valve 46 which controls the rate at which water enters the float. As a variation, the rate at which water enters float 29, can be controlled by placing a valve in each of the air vents instead of the water inlet. Thus, as shown in FIGURE 21, a simple tube 76 replaces valve 46 and air vent valves 77 and 78, controlled by thumbscrew 79 and 80, respectively, replace the simple vents 47 and 48 shown in FIGURES 8–11.

When the gate reaches its fully open position, float 29 comes to rest as shown in FIGURE 10. In this position follower 33 of the float connecting linkage has gone past the end of rocker arm 34 while the latter has been returned to its normal position by springs 43 and 44. When the gate again comes to its closed position after the irrigation period, float 29 rests upon the water surface. The connecting linkage however is disengaged since follower 33 is on the wrong side of rocker arm 34 as indicated in FIGURE 10. This arrangement is necessary, otherwise float 29 would prevent the gate from closing while water was in the ditch. It remains this way as long as water remains in the ditch. When water is drained from the head ditch, float 29 falls with the receding water surface. When it reaches its lowest point, follower 33 slips past the end of rocker arm 34 to its right side as shown in FIGURE 8 (relative position also shown by the dotted lines in FIGURE 10). The gate thus automatically resets itself after water is turned from the ditch and becomes ready for the next irrigation when water is again turned into the ditch.

*Figures 12–14*

The gate shown in FIGURES 12–14 is another form of automatic border inlet gate intended for use in situations similar to those in which the gate of FIGURES 8–11 are used.

In the form now under consideration, a pair of vertical guide rails, indicated generally by 52 and 53, is secured to the sides of the border outlet in side 214 of irrigation ditch 200. These rails may be constructed in any suitable manner as, for example, from angle irons 54, 55, 56, and 57 mounted in pairs with opposing flat sides. The gate 58 itself may be a flat member made of wood or any other suitable material and is large enough to fill substantially the complete area of the border outlet. It is supported vertically between the pair of guide rails and is free to ride up and down. A short distance above the bottom of the gate 58, on its ditch side, there is mounted a hollow float 59 of sufficient size so that its buoyant force is sufficient to raise the gate. The gate opens when water, turned into head ditch 200, reaches a depth in the outlet to the border sufficient to give buoyancy to float 59. The gate opens as the water level in the outlet increases until it is fully open at the maximum flow as shown in FIGURE 13. Water enters the float at a controlled rate through adjustable inlet valve 60 at the lowermost point of the float while displaced air escapes through port 61 at the top of the float. The rate at which the float sinks determines the time of irrigation and is regulated by means of thumbscrew 60a on control valve 60. When the float loses its buoyancy the gate automatically closes by its own weight. This position is shown in FIGURE 14. When water is drained from the ditch, water in the float also drains out through valve 60 and the gate thereby becomes reset ready for the next irrigation. Here too, control of the flow of water into the float 59 can be had by means of the variation shown in FIGURE 22. Water inlet valve 60 of FIGURES 12–14 is replaced by a simple tube 81, while vent 61 is replaced by air valve 82, controlled by means of thumbscrew 83.

*Figures 15–17*

Still another form of border outlet gate is shown in FIGURES 15–17.

This gate, as the two previously described ones, is mounted transversely across a border outlet of ditch 200. It consists of a flat plate 61 which fills substantially the whole cross-sectional area of the border outlet opening and is provided with a rubber strip 62 around its periphery to prevent leakage of water. A pair of arms 63 and 64 is secured to the rear or ditch face of the gate 61 and extends backward along the sides of the outlet opening where they are pivotally mounted on pivots 65 and 66, respectively, secured to the faces of the opening at any suitable height above the bottom of the latter. A distance of about one-third the height (H) of the maximum water level 20 in the ditch has been found to be particularly advantageous.

Secured near the bottom of the gate on its rear or ditch side, is a float 67 having an adjustable inlet valve 68 at its lowermost point and a vent tube 69 extending from the uppermost point to above the maximum water level in the ditch.

The gate in its normal and closed position is shown in FIGURE 16. FIGURE 17 shows a side view of the gate in its open position. The gate opens when water, turned into the ditch, reaches a depth sufficient to give buoyancy to the gate. The gate opens as the water level increases until it is fully open at the maximum flow as shown in FIGURE 17. Float 67 sinks as water is admitted to it through control valve 68 which is adjustable by means of thumbscrew 68a. Air escapes and also enters the float through tube 69. After a predetermined time the gate closes by its own weight. The gate in its closed position with the water surface 20 indicated is shown in FIGURE 16. When water is drained from the ditch, float 67 automatically drains and thus becomes reset and ready for the next irrigation. As a variation, FIGURE 23 shows another means of controlling the rate at which float 67 sinks. Thus, water inlet valve 68 of FIGURES 15–17 is replaced by a simple tube 84 and vent tube 69 is replaced by tube 85. Thumbscrew 86 controls the rate at which air escapes, thus controlling the rate at which water enters to sink float 67.

The three border outlet gates just described may be used with each other in combination with an automatic check gate in the head ditch 200. Such a check gate may be either the one such as shown in FIGURE 4 or the one described in copending application of Humpherys and Bondurant Serial No. 199,546 filed June 1, 1962. When water is turned into the head ditch, it is stopped by the check gate. The level is thereby raised in the head ditch until water flows through outlets into the first border or group of furrows. The outlet into the first border is preferably fitted with either of the gates shown in FIGURES 14 or 16. After the irrigation of this border or group of furrows, this gate automatically closes. The water level in the head ditch immediately begins to rise again. The increment of water level rise is used to trip a paddle-wheel-type gate, as in FIGURE 9, on the next border or set of furrows. Upon completion of irrigation of this border, the paddle-wheel closes and the water level again rises immediately. This next increment of water level rise may be used to trip another paddle-wheel-type gate or to trip a check gate, such as in the copending application, in the head ditch. If the check gate is tripped, water will be released to flow down to the next set of gates. Several paddle-wheel-type border inlet gates may be used together, each operating from the same or different water surface levels. This process of irrigating the field border by border may be extended to as many paddle-wheel-type gates above the main check gate as the capacity of the head ditch will allow. More than one gate as in FIGURE 14 or 16 may also be used simultaneously, depending upon the capacity of the head ditch. With the arrangement described above, irrigation proceeds from the upper to the lower end of the head ditch with the border or group of furrows at the upper end irrigated first.

The tilting check gate of FIGURE 4 may be used by itself or in combination with other border outlet structures, or as a border outlet gate itself when modified to fit the outlet opening.

Although the operation of the irrigation system, as described above, referred to certain specific types of border inlet gates at respective points above the check gate, it will be apparent that the three types which constitute the present invention are interchangeable.

I claim:

In combination with an irrigation ditch having a side outlet (a) an axle mounted horizontally across said side outlet for rotation about the longitudinal axis of said axle;

(b) four paddles extending radially of the axis and parallel therewith in diametrically opposite pairs and secured to said axle with the paddles of one pair disposed at right angles to the paddles of the other pair, each paddle of one pair of paddles and one paddle of the other pair having smaller dimensions horizontally than the outlet measured similarly to permit water flow through the outlet, the other paddle of said other pair being the fourth paddle and conforming to and being of substantially the same horizontal dimensions as the outlet to close off water flow through the outlet, said fourth paddle comprising a gate member;

(c) first latch means attached to said fourth paddle and engageable with securing means fixed in the ditch to secure the fourth paddle across the outlet with the gate in a normally closed position;

(d) adjustable first float means on said fourth paddle connected to the first latch means for releasing said first latch means from the securing means when water in the ditch reaches a predetermined level, whereby water pressure on said fourth paddle causes the gate to rotate, thereby opening the gate and permitting flow of water through said outlet;

(e) second latch means attached to said one paddle of said other pair and engageable with said securing means to secure said one paddle disposed in the outlet with the gate in an open position after said gate has rotated 180°;

(f) a second float mounted on said one paddle so disposed as to initially float on the surface of the water flowing through said outlet when the gate is in said open position;

(g) vent means and water-inlet means on said second float one of which is adjustable to admit water thereto to cause said second float to sink at a predetermined rate; and (h) means connecting the second float with the second latch means for releasing said second latch means from said securing means whereby water flowing against said one paddle causes the gate to rotate and close when said gate has rotated 180° and the first latch means on said fourth paddle again maintains the gate closed.

References Cited by the Examiner

UNITED STATES PATENTS

| 291,327 | 1/84 | Galloway | 61—25 |
| 487,961 | 12/92 | Norton | 61—25 |
| 614,675 | 11/98 | Tilton | 61—25 |
| 670,888 | 3/01 | Ridgway | 61—25 |
| 1,166,991 | 1/16 | Jones | 61—25 |
| 1,579,288 | 4/26 | Edwards | 61—29 |
| 2,168,117 | 8/39 | Danel | 61—25 |
| 2,984,986 | 5/61 | Hill | 61—28 |

FOREIGN PATENTS

| 43,122 | 2/10 | Austria. |

OTHER REFERENCES

Engineering News-Record; page 35, August 10, 1950.

EARL J. WITMER, *Primary Examiner.*

JACOB L. NACKENOFF, *Examiner.*